(12) United States Patent
Kolbe et al.

(10) Patent No.: US 8,661,109 B2
(45) Date of Patent: Feb. 25, 2014

(54) METHOD FOR OPERATING A NETWORK AND A NETWORK

(75) Inventors: Hans-Joerg Kolbe, Darmstadt (DE); Mischa Schmidt, Buerstadt (DE)

(73) Assignee: NEC Europe Ltd., Heidelberg (DE)

(*) Notice: Subject to any disclaimer, the term of this patent is extended or adjusted under 35 U.S.C. 154(b) by 237 days.

(21) Appl. No.: 13/254,559

(22) PCT Filed: Feb. 18, 2010

(86) PCT No.: PCT/EP2010/001022
§ 371 (c)(1),
(2), (4) Date: Sep. 2, 2011

(87) PCT Pub. No.: WO2010/099876
PCT Pub. Date: Sep. 10, 2010

(65) Prior Publication Data
US 2011/0320619 A1    Dec. 29, 2011

(30) Foreign Application Priority Data
Mar. 2, 2009  (EP) ................................... 09002954

(51) Int. Cl.
*G06F 15/16* (2006.01)
(52) U.S. Cl.
USPC ........... 709/223; 709/226; 709/235; 370/216; 370/252
(58) Field of Classification Search
USPC ................... 709/223, 225, 235; 370/216, 252
See application file for complete search history.

(56) References Cited

U.S. PATENT DOCUMENTS

| | | | | |
|---|---|---|---|---|
| 7,881,319 | B2* | 2/2011 | Dobson et al. | 370/412 |
| 8,191,116 | B1* | 5/2012 | Gazzard | 726/4 |
| 2002/0120768 | A1* | 8/2002 | Kirby et al. | 709/235 |
| 2003/0101459 | A1* | 5/2003 | Edson | 725/82 |
| 2009/0028159 | A1 | 1/2009 | Boudreau et al. | |
| 2009/0080449 | A1* | 3/2009 | Zhu | 370/401 |
| 2011/0243553 | A1* | 10/2011 | Russell | 398/25 |
| 2012/0047551 | A1* | 2/2012 | Pattar et al. | 726/1 |
| 2012/0164979 | A1* | 6/2012 | Bachmann et al. | 455/411 |

FOREIGN PATENT DOCUMENTS

WO    2008088259 A1    7/2008

OTHER PUBLICATIONS

International Search Report dated Aug. 5, 2010, corresponding to the PCT application.

(Continued)

*Primary Examiner* — Khanh Dinh
(74) *Attorney, Agent, or Firm* — Young & Thompson

(57) ABSTRACT

For allowing an enhancement of diversity of network applications in a simple way a method for operating a network, especially an IP (Internet Protocol) network, is claimed, wherein a local network is in connection with the network via a gateway and wherein a UE (User Equipment) of the local network is performing a session setup by communicating with a functional entity of the network in order to communicate with or to start a UE-related and/or session-related application. The method is characterized in that the application is communicating with a local network controller, wherein the network controller is receiving a UE-related and/or session-related parameter (LID—Local Identifier) from the application for locating a UE and/or a specific session within the local network based on the received parameter. Further, an according network is claimed, preferably for carrying out the above mentioned method.

21 Claims, 2 Drawing Sheets

(56) References Cited

OTHER PUBLICATIONS

Figure 1:
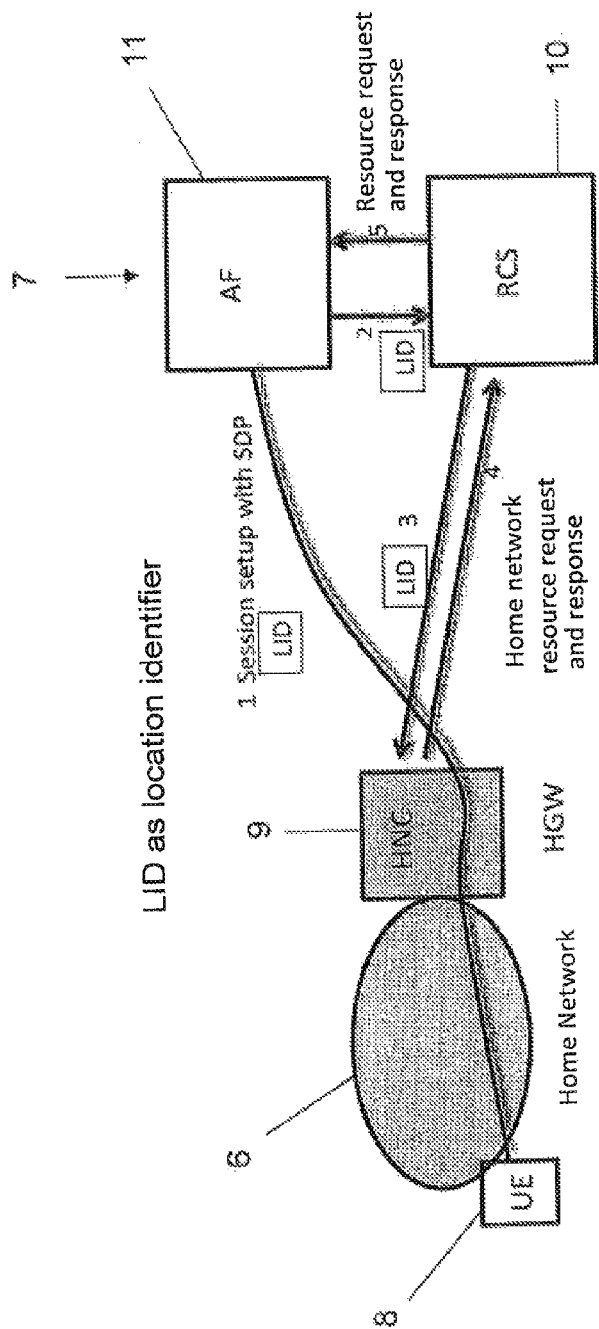

Telecommunications and Internet converged Services and Protocols for Advanced Networking (TISPAN); Resource and Admission Control Sub-System (RACS) Functional Architecture; European Telecommunications Standards Institute (ETSI), Sophia Antipolis Cedex, France vol. TISPAN, No. V2.0.0, May 1, 2008.

Japanese Office Action, dated Jan. 30, 2013, from corresponding JP application.

* cited by examiner

METHOD FOR OPERATING A NETWORK AND A NETWORK

The present invention relates to a method for operating a network, especially an IP (Internet Protocol) network, wherein a local network is in connection with the network via a gateway and wherein a UE (User Equipment) of the local network is performing a session setup by communicating with a functional entity of the network in order to communicate with or to start a UE-related and/or session-related application. Further, the present invention relates to a network, especially an IP (Internet Protocol) network, wherein a local network is in connection with the network via a gateway and wherein a UE (User Equipment) of the local network is performing a session setup by communicating with a functional entity of the network in order to communicate with or to start a UE-related and/or session-related application.

In current network deployments, UEs do not directly attach to the network or operator network. They attach locally to a gateway or Home gateway (HGW) and receive a local IP address that is only valid inside the local network or home network. To be able to access services in the network or operator network or the internet, this address gets translated to the official, globally routed IP address of a network controller or HGW, using NAT/NAPT (Network Address Translation/Network Address Port Translation) technologies to which we refer in the remainder of this text as NAT.

End-to-end Quality of Service (QoS) assurance for Multimedia (MM) Sessions over IP networks requires resource and admission control combined with appropriate dynamic policy installation in all parts of the network. Despite methods to reserve network resources and install policies based on on-path signaling—e.g. using RSVP (Resource reSerVation Protocol) or NSIS (Next Steps In Signaling)—or local application layer gateways (ALGs), Resource Control Systems (RCS) like the ETSI TISPAN RACS, the ITU-T RACF or the currently being developed Broadband Forum BPCF can reserve and control resources triggered by a generalized Application Function (AF). The ETSI TISPAN RACS is known from ETSI ES 282 003 V2.0.0, Telecommunications and Internet converged Services and Protocols for Advanced Networking (TISPAN); Resource and Admission Control Sub-System (RACS): Functional Architecture. The ITU-T RACF is known from ITU-T Recommendation Y.2111 Resource and admission control functions in Next generation networks. The AF is the functional entity with whom the UE (user equipment) communicates to set up a multimedia session.

Current RCS receive resource requests by the AF and respond with either an accept or a reject message. In case they accept, they furthermore install adequate policies on the network elements in the media path.

It could be useful not only in applications needing Quality of Service assurance but also in other applications to locate devices and/or sessions. Information about specific devices or user equipments and/or sessions in many cases gets lost during session set up proceedings.

Documents which are referring to session setup protocols and which are forming background of the invention are for example ETSI TISPAN TS 183 063: "IMS-based IPTV stage 3 specification", RFC 4566: "SDP: Session Description Protocol" (http://www.ietf.org/rfc/rfc4566.txt) and RFC 4091: "The Alternative Network Address Types (ANAT) Semantics for the Session Description Protocol (SDP) Grouping Framework" (http://www.ietf.org/rfc/rfc4091.txt).

It is an object of the present invention to improve and further develop a method for operating a network and an according network for allowing an enhancement of diversity of network applications in a simple way.

In accordance with the invention, the aforementioned object is accomplished by a method comprising the features of claim 1 and a network comprising the features of claim 22. According to claim 1 the method is characterized in that the application is communicating with a local network controller, wherein the network controller is receiving a UE-related and/or session-related parameter (LID—Local Identifier) from the application for locating a UE and/or a specific session within the local network based on the received parameter. According to claim 22 the network is characterized in that the application is comprising means for communicating with a local network controller, wherein the network controller is comprising means for receiving a UE-related and/or session-related parameter (LID—Local Identifier) from the application for locating a UE and/or a specific session within the local network based on the received parameter.

According to the invention it has been recognized that it is possible to locate a UE and/or a specific session within the local network in a simple way. In concrete terms the application has to communicate with the network controller of the local network, wherein the network controller is receiving a UE-related and/or session-related parameter from the application. Such a parameter can be designated as LID (Local Identifier) which is identifying a UE and/or a specific session within the local network. Thus, the network controller can locate the UE and the path through the local network towards it and/or a specific session based on the received parameter.

On the basis of such a method or network an enhancement of diversity of network applications is easily allowed, wherein the local network could be a home network and the gateway could be a home gateway. Generally, a gateway could contain the network controller.

Within a preferred embodiment the application is split into a RCS (Resource Control System) for controlling and/or reserving network resource required for the session within the network and the function handling the application logic requested by the UE. In this case the RCS could communicate with the network controller in order to control and/or reserve network resource required for the session within the local network, preferably a home network.

In order to include local or home networks into the scope of the RCS, the network controller or Home Network Controller (HNC) could receive resource requests from the RCS. Since local or home networks are becoming more and more complex, the network controller or HNC could be enabled to identify the UE that originated the session setup. To do so, it could learn a unique local identifier (LID) of the UE, e.g. the local IP address. In case of IP and NAT/NAPT performed in the local or home network towards the operator network, this information in most cases gets lost. For multicast sessions it currently always gets lost, i.e. is not transported to the AF/RCS. Furthermore, in the case where a UE inside the local or home network has negotiated with the network controller or HNC a local session, e.g. for authorization or resource reservation, the corresponding session identifier needs to be included in the remote requests from RCS to correlate the sessions.

Preferably the parameter could comprise or consist of the local network address of the UE with or without a port number, preferably local IP address. In this case, an already existing parameter can be used as identifying parameter within the above method.

Alternatively, the parameter could comprise or consist of a specific local characteristic of a UE, a string or a local session ID.

Further alternatively, the parameter could comprise or consist of a random number, a byte code array or an identifier negotiated through a bootstrapping algorithm among devices inside the local network.

In other words, the parameter could consist or comprise of any type of locally significant generic identifier.

With regard to a very simple use case the parameter could be generated by the network controller, preferably during attachment of the UE to the network, local network or network controller or upon a specific request by preferably the UE. Alternatively and also with regard to a very simple embodiment of the method the parameter could be generated by the UE. Thus, the parameter could be generated before performing a session setup.

Within a further preferred embodiment it could be possible that the parameter is not related to the UE which is performing the session setup. Thus, the parameter could be used to request media for one or multiple reception points that have different addresses than the UE that is performing the session setup. In other words, a UE can request a session for other UEs.

Within a further preferred embodiment the parameter could be transported during session setup from the UE via the functional entity to the application or applications. A very reliable provision of the parameter at the application could be guaranteed by such a proceeding.

Within the claimed method it is preferred that the parameter will be looped from the local network through a network domain where it has no significance back to the local network via the same or a different network path. In a concrete embodiment the parameter could be looped from the local network through an RCS where it has no significance back to the local network.

With regard to a very simple proceeding the functional entity, preferably an AF (Application Function), could be enabled to include the parameter in requests to the application. The integration of the parameter in an already planned request is providing a very smart proceeding.

For avoiding any unintended effects the parameter could be opaque in the network domain and could be passed through the network domain without any modification.

Preferably the session setup could be performed by a session description protocol, preferably by SDP (Session Description Protocol). The use of already known protocols is possible in connection with the claimed method.

Thus, the parameter could be part of the session description protocol without causing any particular problem. Concretely, the parameter could be carried by an a-, i- or o-line, wherein the a-line is preferred.

The claimed method is able to support unicast as well as multicast sessions. There is no limitation in this regard.

Within a further preferred concrete embodiment the parameter could be used for correlating a local session with an incoming resource request from the application or RCS. Accordingly, the resources within a network and the resources within a local network can be correlated.

Preferably a local session could be characterized by an application or a network attachment session.

Within a further preferred embodiment of the above method a local admission control procedure could be based on obtaining the network path towards the UE inside the local or home network based on the parameter.

Preferably, the network controller or the application function could make an independent decision on which service to provide based on the LID or parameter.

The present invention describes a method, wherein a parameter can be transported in the form of a local identifier (LID) of the UE that originates the session through a different network domain where it has no significance. The method is designed for unicast and multicast sessions, e.g. being set up using SIP/SDP (Session Initiation Protocol/Session Description Protocol) or RTSP/SDP (Real Time Streaming Protocol/Session Description Protocol). There is provided a procedure how the HNC locates the UE inside the home network based on the received identifier. The LID itself can be also used as an opaque string that is locally generated by the HNC and transferred to the UE during network attachment or upon a specific request.

Within the present invention will be created a local identifier (LID) that can consist of local addresses or any type of locally significant generic identifiers, e.g. a string or a local session ID. The LID can thus be created in a way that it does not disclose any private home network information to the application or application function.

In the case of using SDP for session signaling the SDP information can be enhanced, which is carried in session setup signaling to include unicast or multicast stream receiver local address within the home network or other type of locally unique identifier.

Based on the present invention a local network controller or HNC is enabled to locate a UE and/or a specific session within the local or home network based on the LID.

In a short summary important features, which can be realized, are:
1) Defining and assigning a local identifier to UEs and/or sessions
2) Transport the LID through a network domain where it has no significance back to the domain where it originated from
3) Adding a new local identifier (LID) parameter to SDP
4) Enable the AF to pass the LID information to the RCS or any other application
5) Enable the local identifier to carry a session identifier to cross-connect local application and/or network attachment sessions with remote requests, e.g. in the case of IP telephony for reservation of such a telephony within a defined time interval.
6) Enable the HNC to locate UEs and/or a UE sessions based on the LID Advantages of the Invention can be summarized as follows:
Current state of the art is not able to identify Multicast reception point inside the home. This can be of big help for in-home resource control mechanisms.
On top, for unicast, a mechanism to locate devices inside the home network or inside a local network has also not been specified yet.
Using SDP to carry the LID, the invention is easily integrated into IMS (IP Multimedia Subsystem) based services such as e.g. IMS based IPTV, but is not limited to SIP based services and can also be applied to e.g. RTSP.
Defines a base technology to enable remote resource control for home networks enabling support for encrypted signaling sessions without the need to implement in-path mechanisms.
Uses existing infrastructures, e.g. authentication of session setup (e.g. SIP Invite). Nothing to be re-invented, just adding a new parameter.
Minimum impact on UE software.
Applications other than an RCS can make use of the method by connecting to the AF and the HNC.

There are several ways how to design and further develop the teaching of the present invention in an advantageous way. To this end, it is to be referred to the patent claims subordinate to patent claim 1 on the one hand, and to the following explanation of preferred examples of embodiments of the invention, illustrated by the drawing on the other hand. In connection with the explanation of the preferred examples of embodiments of the invention by the aid of the drawing, generally preferred embodiments and further developments of the teaching will be explained. In the drawings FIG. 1 is illustrating a first preferred embodiment of a method for operating a network according to the invention and FIG. 2 is illustrating a second preferred embodiment of a method for operating a network according to the invention.

Figure 2:
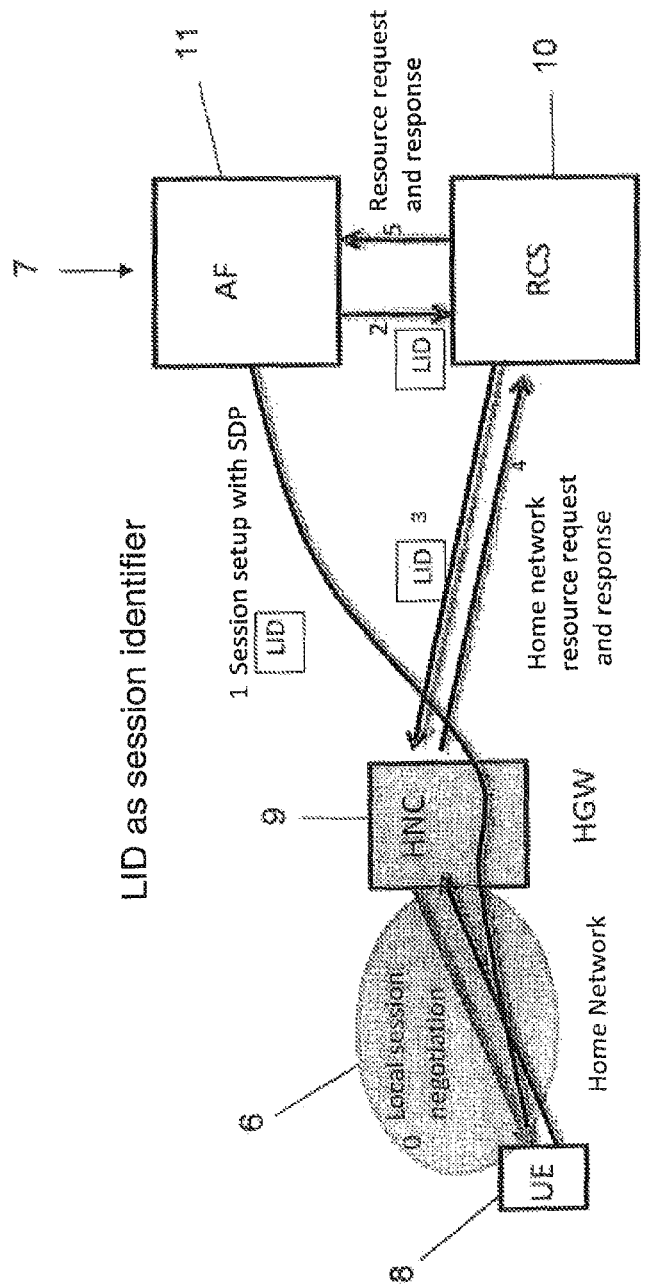

FIG. 1 is illustrating a first preferred embodiment of a method for operating a network wherein a local network (6) in the form of a home network is in connection with the network via a home gateway, which may contain the local home network controller (9) (HNC). The UE (8) of the home network is performing a session setup by communicating with a functional entity of the network, namely an application function AF (11), which then communicates with an RCS (10).

The UE sends a session initiation request to the AF (11) through the HGW (Home GateWay) comprising the HNC (9). The AF (7) extracts the resources needed from the SDP and sends a request to the RCS (10) that then reserves resources in the operator network. Since the request contains the official IP address of the HGW, the RCS (10) is able to locate the home network and to perform resource reservation towards the home network. In order to reserve resources inside the home network, the HNC is enabled to locate the UE (8) inside the home network. To do so, it will receive a local identifier (LID) from the RCS (10).

In concrete implementations, the local IP address of the UE (8) can be used by the HNC (9) to locate a UE (8) inside the home network. In case none of the signaling proxies in the signaling path change SDP content before a request is sent to the RCS (10), the local address can be extracted from the a- and c-lines. Still, it needs to be explicitly included in the request towards the RCS (10) and the HNC (9) needs to include a function to locate the client, which is explained later. However, this works only for unicast services since for multicast services the SDP format is different and does not carry the UE (8) IP address in c- or a-lines: in the case of session negotiation for multicast services, SDP does currently not contain a local IP address since this is not needed in order to forward the media inside the home network (destination address of the media is the multicast address of the stream) (see e.g. ETSI TISPAN TS 183 063: "IMS-based IPTV stage 3 specification").

In the case where SDP is re-written, e.g. in order to facilitate NAT traversal, the local address or a generic LID should be included in the session setup request from the UE because otherwise this information would get lost since a- and c-line for the receiving media have been re-written.

Using the SIP "VIA"-header for transporting the IP address of a client is not appropriate since it would implicitly assume that the IP address of the signaling client is the same that the media receiver has and restricts the use of the LID to IP addresses (e.g., not sessions). Furthermore, extracting "Via-Headers" for such a purpose is not compliant to 3GPP and TISPAN architectures and it can not be guaranteed that the "Via-Headers" contain the desired information in current and future networks. In case a local B2BUA (back-to-back user agent) is in the signaling path, the via headers will not contain the desired information anyway.

Local snooping of session setup messages inside the home network would be suitable to identify endpoints inside the home network. Since this method does not work for encrypted signaling as defined by IMS AKA (Authentication and Key Agreement), the home network should learn the UE's LID from the RCS.

The LID can also be used to correlate a local session (e.g., between the UE and the HNC to reserve resources inside the home network before setting up a session with the AF) with an incoming resource request from the RCS. In that case, the LID carries a session ID instead of an ID that can be used to locate a device. Such a case is illustrated in FIG. 2 according to the second preferred embodiment.

Additionally this new parameter might be used to request media for non SDP enabled end devices as reception points. Such a reception point could be a "Home Hub", which could be used for receiving and distributing requested media within a home network. The request for media could be performed by a UE resulting in the delivery of media to the "Home Hub".

Furthermore, applications other than a RCS could benefit from such UE-related and/or session-related information given by the LID.

The HNC may reside in the home gateway but it can also be implemented in any other entity inside the home network which is reachable from the application.

Important features of the embodiments will be explained in further detail in the following passages:
1) Define and Assign a Parameter (LID—Local Identifier):

To correlate a session setup with a device (UE) and/or a session inside the local or home network, a generic local identifier (LID) is proposed. The LID can consist of e.g., The local IP address (with or without port number) of the UE that will exchange media (does not need to be the device that performs signaling).

A specific local characteristic of a UE (e.g., MAC-address (Media Access Control), IMEI, SIP-Address, URL, serial number, pre-provisioned identifier like "living room", "kitchen").

An identifier generated by the HNC and sent to the UE, e.g. during network attachment using DHCP (Dynamic Host Configuration Protocol).

An identifier generated by the HNC upon request by the UE (e.g., a reservation number for a reserved path with QoS).

An identifier generated by the UE sent for registration to the HNC, e.g. a random number, a byte code array, an identifier negotiated through a bootstrapping algorithm among devices inside the local network.

The namespace for the LID is restricted to the local network, i.e. the home network.

As an enhancement, the LID can be used to request media for one or multiple reception points that have different IP addresses than the device that is performing the signaling for session setup.

An example use case might be a "Home Hub" with SIP/SDP client that can control various end devices via UPnP (Universal Plug and Play). The "Home Hub" requests a media session with multiple m-lines for IPTV with audio and specifies for the different m-lines different LID parameters to indicate e.g. IP address of the STB (Set Top Box) for receiving the video stream and a distinct IP address for the stereo receiving the audio streams. It could then use another protocol such as UPnP to trigger the stereo and the STB to "tune" into the target multicast groups.
2) Pass the LID Through Other Network Domains where it has No Significance Back to the Home Network The LID can be included in the signaling for session setup that leaves the domain where it has significance, e.g. when carried over SDP to the AF.

The LID can be passed through other network domains and then be passed back over the same or a different signaling channel towards the home network, i.e. the HNC.

In the foreign domain, i.e. non-local network, the LID is opaque and passed without modification.

An example for this is the use case depicted in FIGS. 1 and 2, where the LID is received in the AF, passed to the RCS and passed back in RCS signaling towards the HNC (different signaling channel/path).

3) Add a New Parameter (LID—Local Identifier) to SDP

For multimedia (MM) signaling, commonly SDP is used. SDP is e.g. carried in IMS based networks within SIP. However, SDP is also used in e.g. RTSP based services and could be a good choice to carry the local IP address of the UE. Therefore this invention could define an additional SDP parameter intended to indicate the local IP address and/or port number or a generic local identifier (LID). The IP address and port can be seen as an implementation of a LID. Service end points such as the UEs can enrich the MM signaling they send by setting this parameter.

With the present invention, we add information on the local identifier of the UE that initiated session setup to SDP. The LID can consist of local IP address and port. Other device-specific parameters like serial numbers or identifiers learned during network attachment of the UE to the HGW (e.g. using DHCP Options) are also applicable.

As an example, a-line parameters can carry the local address information. This a-line can e.g. be passed to the TISPAN RACS system from the P-CSCF (Proxy-Call Session Control Function) in case of IMS based IPTV and can e.g. offer a Home RACS controller inside the Home Gateway additional information on where the media traffic will flow to. This will enable the HNC to locate a device inside the home network which is needed to decide accurately for both unicast and multicast services whether the resource requirements inside the home network can be met. The new parameter could be named "Local Identifier" (LID).

The a-line can be both session level or media level, e.g. in case a distributed media session is used, and may occur multiple times. Generally the a-line should be of the form a=<flag> or a=<attribute>:<value>. The latter is more appropriate for the intended use of carrying LID but still this invention covers both methods.

Examples are:
a=LID:<IPv4address>
a=LID:<IPv6address>
a=LID:<IPv6address:Port>
a=LID:<IPv4address:Port>
a=LID:<Octet String>

The exact attribute name is subject to LANA (Internet Assigned Numbers Authority) registrations or implementation.

The LID attribute can also carry other forms of address information (which is less commonly used in the Internet) e.g. by combining it with the ANAT (Alternative Network Address Types) semantics for SDP. The LID can also carry an Octet String that represents a unique identifier within the home network, e.g. an alphanumerical string issued by the HGW during network attachment of the UE using DHCP options. If the notation including Port information is used, then the provided Port information must be identical with the port information passed in the media lines and therefore the use of the Port enriched LID attribute is encouraged on m-line level whereas a session level LID attribute shall not contain a port. Also in case of unicast services the c-line parameter should be the same as the provided value in the LID attribute, unless the distributed media reception is used—see below.

The present invention covers all other suitable SDP lines, e.g. i-line or o-line, and also the name of the parameter is not be tied too strictly to "LID".

Using the local IP address in an o-line towards the AF is an enhancement of current SDP as using e.g., the a-lines.

The use of multiple different LID a-lines on multiple m-lines could be used to realize e.g. distributed media reception sessions so that e.g. one controller entity could request multimedia to be delivered to multiple end points directly (e.g. "home hub" example).

IMS based IPTV STBs should convey the LID in their session setup signaling so that the AF can inform RCS (and potentially Home HNC) for E2E (End to End) Admission Control and Resource Reservation.

4) Enable an AF to Pass the Parameter or LID Information to the RCS or any Other Application The AF can receive a LID in two ways:

Directly, explicitly when the UE used the LID parameter.

Indirectly, implicitly in case it received unchanged IP addresses—if no NAT by the gateway or home gateway is performed—in SDP, e.g. via a-lines. The LID will then be the local IP address.

The AF will then send the LID to the RCS in the resource request as a Diameter AVP or using a similar protocol (e.g. RADIUS).

As an example, in TISPAN RACS or 3GPP Rx, the LID can be transported through the already specified "Codec-Data" AVP when being transported in a-lines. Using o-lines would need a more detailed specification of P-CSCF behavior and is not standards-compliant. The same is true for VIA-Headers in SIP.

Applications other than a RCS can also highly benefit from becoming enabled to locate a device inside the home network. Thus, use cases are not restricted to the ones with an RCS.

5) Enable the Parameter or the Local Identifier to Carry a Session Identifier to Cross-Connect Local Sessions with Remote Requests, e.g. FIG. 2.

The LID can also be used to include a session ID, either in conjunction with carrying an address or standalone. This session ID describes a session that had been taking place or is still open between the UE and the HNC or the network controller. An example could be the request from the UE to the HNC or the network controller to reserve a certain amount of bandwidth of a specific traffic class with a given priority. This ID would then be included in the resource request from the RCS. The HNC or the network controller could then correlate both, the internal session and the remote request, making it possible to reply immediately to a resource request in case the local reservation had already been accomplished using that session ID.

In the current IETF definition of SDP (RFC4566), the mandatory o-line can transport also a global session identifier. Within this invention, the identifier needs to be local only since its combination with the ongoing session makes it preferred.

6) Enable the HNC or Network Controller to Locate UEs or UE Sessions Based on the Parameter or LID To calculate the resources on the path inside the local or home network to the UE, the network controller or HNC needs to locate the UE. Upon receiving the parameter or LID, it acts as follows:

Having received one or more local IP address in the LID parameter(s), it looks up the local network attachment function's database where layer-2 addresses and the assigned IP addresses are stored. The layer-2 address(es) then specifies implicitly the location of the UE(s) since e.g. in Ethernet deployments the layer-2 address (MAC address) is learned on the physical port where the UE is directly attached to.

Having received one or more parameters or generic identifier(s), i.e. referring to UE(s) or to session(s), the network controller or HNC performs the same steps starting with looking up in its local database. The following steps are as described above.

Typically we expect the network controller or HNC and local network attachment function to be co-located inside the HGW.

EXEMPLARY USE CASES

Example a

Implicit LID as IP Address for Unicast, Explicit SDP-LID for Multicast

In this scenario, devices using unicast do not need to be changed in order to support the LID. Only the devices that use session setup with SDP for multicast services need to be upgraded. Since this affects only currently IPTV devices using SIP or RTSP, the required UE upgrades are restricted to IPTV STBs, which is feasible to deploy.

Example b

Explicit LID Required for All Sessions

In this case, all devices requiring guaranteed QoS need to implement the LID which results in a necessary upgrade of all of them. Worst case, devices not implementing the LID will get no QoS inside the home network. QoS on the HGW's uplink is still possible with the RCS since for that, the LID is not needed.

Additional Use Case:

Applications beyond the QoS use case (RCS) can make use of the LID. An example is: An application that allows sessions based on a local parameter like "Do not play music in the living room after 11 p.m."

On the basis of the inventive method and network it is possible to define a supporting mechanism for remote in-home QoS control without the need to deploy on-path signalling or ALGs, even in the case a fraction of the sessions uses encrypted signalling by enhancing e.g. SDP to transport an LID or a parameter. The invention is providing a mechanism with a minimum impact on existing UEs.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a network, especially an IP (Internet Protocol) network, wherein the network is comprising a local network and an operator network, wherein the local network is in connection with the operator network via a gateway and wherein a UE (User Equipment) of the local network is performing a session setup by communicating with a functional entity of the operator network in order to communicate with a UE-related and/or session-related application or in order to start a UE-related and/or session-related application, wherein the application is communicating with a local network controller, wherein the local network controller is assigned to the local network and is receiving a UE-related and/or session-related parameter (LID—Local Identifier) from the application for locating a UE and/or a specific session within the local network based on the received parameter, wherein the parameter will be looped from the local network through an operator network domain where the parameter has no significance back to the local network via the same or a different network path, and wherein the application is split into a RCS (Resource Control System) for controlling and/or reserving network resource required for the session within the network and the function handling the application logic requested be the UE.

2. A method according to claim 1, wherein the RCS is communicating with the local network controller in order to control and/or reserve network resource required for the session within the local network.

3. A method according to claim 1, wherein the parameter is comprising or consists of the local network address of the UE with or without a port number, preferably local IP address.

4. A method according to claim 1, wherein the parameter is comprising or consists of a specific local characteristic of a UE, a string or a local session ID.

5. A method according to claim 1, wherein the parameter is comprising or consists of a random number, a byte code array or an identifier negotiated through a bootstrapping algorithm among devices inside the local network.

6. A method according to claim 1, wherein the parameter will be generated by the local network controller, preferably during attachment of the UE to the operator network, local network or local network controller or upon a specific request by preferably the UE.

7. A method according to claim 1, wherein the parameter will be generated by the UE.

8. A method according to claim 1, wherein the parameter will be used to request media for one or multiple reception points that have different addresses than the UE that is performing the session setup.

9. A method according to claim 1, wherein the parameter will be transported during session setup from the UE via the functional entity to the application or applications.

10. A method according to claim 1, wherein the functional entity, preferably an AF (Application Function), will be enabled to include the parameter in requests to the application.

11. A method according to claim 1, wherein the parameter is opaque in the operator network domain and will be passed through the operator network domain without modification.

12. A method according to claim 1, wherein the session setup will be performed by a session description protocol, preferably by SDP (Session Description Protocol).

13. A method according to claim 12, wherein the parameter will be part of the session description protocol.

14. A method according to claim 12, wherein the parameter will be carried by an a-, i- or o-line.

15. A method according to claim 1, wherein the session is a unicast or multicast session.

16. A method according to claim 1, wherein the parameter will be used for correlating a local session with an incoming resource request from the application or RCS.

17. A method according to claim 1, wherein a local session is characterized by an application or a network attachment session.

18. A method according to claim 1, wherein a local admission control procedure is based on obtaining the network path towards the UE inside the local or home network based on the parameter.

19. A method according to claim 1, wherein the network controller or the application function makes an independent decision on which service to provide based on the LID.

20. A network, especially an IP (Internet Protocol) network, preferably for carrying out the method according to claim 1, wherein the network is comprising a local network and an operator network, wherein the local network is in connection with the operator network via a gateway and wherein a UE (User Equipment) of the local network is performing a session setup by communicating with a functional entity of the operator network in order to communicate with a UE-related and/or session-related application or in order to start a UE-related and/or session-related application, wherein the application is comprising means for communicating with a local network controller, wherein the local network controller is assigned to the local network and is comprising means for receiving a UE-related and/or session-related parameter (LID—Local Identifier) from the application for locating a UE and/or a specific session within the local network based on the received parameter, wherein the parameter will be looped from the local network through an operator network domain where the parameter has no significance back to the local network via the same or a different network path, and wherein the application is split into a RCS (Resource Control System) for controlling and/or reserving network resource required for the session within the network and the function handling the application logic requested be the UE.

21. A method for operating a an Internet Protocol network comprised of a local network and an operator network, the method comprising the steps of:
having the local network be in connection with the operator network via a gateway;
having a User Equipment of the local network perform a session setup by communicating with a functional entity of the operator network in order to communicate with or start an application, the application being a User Equipment-related application and/or a session-related application, the application being split into i) a Resource Control System for controlling a network resource and/or reserving a network resource required for the session within the network, and ii) a function of handling the application logic requested be the User Equipment;
having the application communicate with a local network controller to provide the local network controller with i) a User Equipment-related parameter, and/or ii) a session-related Local Identifier parameter for locating a) a User Equipment session and/or b) a specific session within the local network based on the received parameter, wherein the local network controller is assigned to the local network; and
looping the parameter from the local network controller through an operator network domain where the parameter has no significance back to the local network.

* * * * *